Patented May 20, 1924.

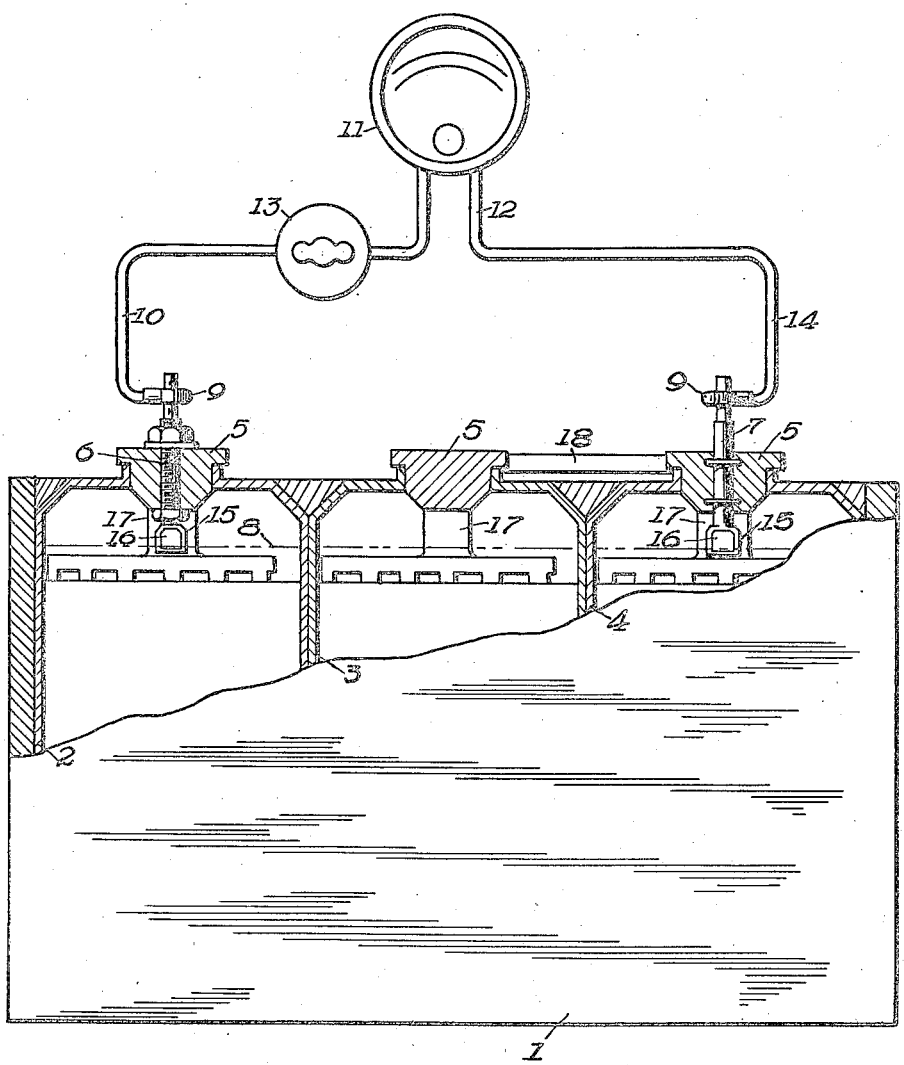

1,494,625

UNITED STATES PATENT OFFICE.

AMY S. PIERCE, OF PEORIA, ILLINOIS.

BATTERY INDICATOR.

Application filed June 23, 1920. Serial No. 391,190.

*To all whom it may concern:*

Be it known that I, AMY S. PIERCE, a citizen of the United States, and a resident of Peoria, in the county of Peoria and State of Illinois, have invented certain new and useful Improvements in Battery Indicators, of which the following is a full, clear, and exact description, reference being had to the accompanying drawing, forming part of this specification.

My invention relates to means for indicating that one or more of a plurality of battery cells require attention due to the evaporation or condition of charge or discharge of the electrolyte.

One object of my invention is to provide two or more of the cells of a battery with an electrode or contact member additional to the regular positive and negative electrodes required to complete the cell and to so establish a circuit through the additional electrodes or contact members and the electrolyte that an indicating device may be operated by the circuit so established.

Other objects of my invention will appear and be described in the specification.

The novelty of my invention will be hereinafter more fully set forth and specifically pointed out in the claims.

The accompanying drawing is a side view of an ordinary battery partly broken away and partly in section showing the application of my indicator thereto and its circuit.

In practicing my invention and assuming that the device is to be used in connection with a six volt or three cell storage battery of the usual or any suitable type, the battery being indicated at 1 and the individual cells at 2, 3 and 4, each cell being provided with a filler and vent plug 5, I provide two or more of these plugs with a contact member which may be either adjustable in its position as shown at 6 to the left of the figure, wherein the stem of the contact member may be threaded and provided with a nut above and another nut below the plug 5 whereby the member may be vertically adjusted with relation to the plug, or may be formed as shown at 7 with a collar or collars or other irregularities and around which the plug 5 which is usually made of hard rubber may be formed to the end that the position of the contact member with relation to the plug is permanently established as shown to the right of the figure, each of these members extending to a point below the normal level of the electrolyte as indicated by the broken line 8. The upper portion of each contact member is adapted to receive any suitable clip 9 to which a conductor 10 is attached, the conductor 10 extending to any suitable indicating device 11 which may be a volt meter of the ordinary construction graduated to read voltage, or graduated in any other suitable manner, or the indicator may be a lamp or other device as preferred, the completion of the circuit being through conductor 12, switch 13 conductor 14 and so to the clip 9 which engages another of the contact members, mounted in a different cell of the battery, the cells of the battery being connected together in the usual way.

If it is desired to merely test the level of the electrolyte periodically, the switch 13 may be employed though the device will work properly without this switch, and when used without a switch operates on a closed circuit until the level of the electrolyte in one or more of the cells lowers to a point where it opens the circuit.

The indicator may be so arranged and calibrated that as the level of the electrolyte lowers, the approximate level of the electrolyte may be determined before the opening of the circuit due to the lowering of the electrolyte to a level below the lower end of the contact member.

By forming the lower portions of the contact members as shown at 15 which may be of a cross-section similar to that of a portion of a battery plate and providing these portions with material similar to that used in connection with the battery plates, better and more sensitive readings may be obtained, due to the increase of the current produced by the contact of the electrolyte with the active material.

When installed as shown in the drawing and assuming that the contact member 6 is electrically positive in characteristics, and the contact member 7 is negative, the circuit is from the electrolyte in the cell 2 to the contact member 6 and so through the leads and the indicator to the contact member 7 and the electrolyte in cell 4, the circuit being completed through whatever cells may intervene between cells 2 and 4, by means of the ordinary battery terminals and plates, and in this connection I have represented the battery posts at 17 and one of the connectors which extend from the negative post of one cell to the positive post of the next in series at 18.

Having thus fully described my invention, I claim:

1. In a battery indicator the combination of a plurality of cells each provided with its regular equipment of plates, terminals and connections, a contact member mounted in one cell and terminating at approximately the normal level of the electrolyte therein, a contact member mounted in another cell and terminating at a point approximately at the normal level of the electrolyte in said cell, an electric connection between said members, and an indicator in said connection.

2. In a battery indicator the combination of a group of cells each provided with positive and negative elements and connections and electrolyte, an additional positive electrode mounted in one cell and extending approximately to the danger level of the electrolyte in that cell, an additional negative electrode mounted in another cell and extending approximately to the danger level of the electrolyte in that cell, an electric connection between the additional electrodes, and an indicator in the electric connection.

3. In a battery testing device, the combination of a plurality of cells each provided with its regular equipment of plates, terminals and connections, an electrode mounted in one cell and terminating at approximately the normal level of the electrolyte therein, a second electrode mounted in another cell and terminating at approximately the normal level of the electrolyte therein, an electric connection between said electrodes and an electroresponsive device in said connection.

4. In a battery testing device, the combination of a plurality of cells each provided with its regular equipment of plates, terminals and connections, an electrode mounted in one cell and terminating at approximately the normal level of the electrolyte therein, a second electrode mounted in another cell and terminating at approximately the normal level of the electrolyte therein, an electric connection between said electrodes and an electric indicating device in said connection.

AMY S. PIERCE.